(12) United States Patent
Brewer

(10) Patent No.: US 8,403,400 B2
(45) Date of Patent: Mar. 26, 2013

(54) AIR FLOW GUIDE FOR A TRACTOR TRAILER GAP

(75) Inventor: Robert Renie Brewer, High Point, NC (US)

(73) Assignee: Volvo Group North America, LLC, Greensboro, NC (US)

( * ) Notice: Subject to any disclaimer, the term of this patent is extended or adjusted under 35 U.S.C. 154(b) by 0 days.

(21) Appl. No.: 13/208,729

(22) Filed: Aug. 12, 2011

(65) Prior Publication Data

US 2012/0038183 A1    Feb. 16, 2012

Related U.S. Application Data

(60) Provisional application No. 61/373,409, filed on Aug. 13, 2010.

(51) Int. Cl.
*B62D 35/00* (2006.01)
(52) U.S. Cl. .................. 296/180.1; 296/180.2
(58) Field of Classification Search .... 296/180.1–180.4, 296/184.4; *B62D 35/00*
See application file for complete search history.

(56) References Cited

U.S. PATENT DOCUMENTS

| | | | |
|---|---|---|---|
| 3,934,922 A * | 1/1976 | MacCready et al. | 296/180.4 |
| 3,960,402 A | 6/1976 | Keck | |
| 3,999,797 A | 12/1976 | Kirsch et al. | |
| 4,682,808 A * | 7/1987 | Bilanin | 296/180.4 |
| 4,706,910 A * | 11/1987 | Walsh et al. | 244/130 |
| 6,886,882 B2 * | 5/2005 | Farlow et al. | 296/180.4 |
| 6,991,281 B2 | 1/2006 | Spence et al. | |
| 7,216,923 B2 | 5/2007 | Wong et al. | |
| 7,240,958 B2 | 7/2007 | Skopic | |
| 7,431,381 B2 * | 10/2008 | Wood | 296/180.1 |
| 2002/0030384 A1 * | 3/2002 | Basford | 296/180.1 |
| 2010/0194143 A1 * | 8/2010 | Perkins et al. | 296/180.2 |
| 2010/0225143 A1 | 9/2010 | Skopic | |
| 2011/0115254 A1 | 5/2011 | Skopic | |

\* cited by examiner

*Primary Examiner* — Glenn Dayoan
*Assistant Examiner* — Pinel Romain
(74) *Attorney, Agent, or Firm* — Martin Farrell; Michael Pruden

(57) ABSTRACT

An apparatus for affecting airflow in a gap between a lead vehicle and a connected trailing vehicle, includes a guide vane having a leading edge, a trailing edge, a gap side surface, and an outward facing surface, and a support apparatus mountable on a vehicle for supporting the guide vane in a vertical orientation relative to the vehicle with a space between the vehicle and the guide vane gap side surface and with at least a portion of the vane extending beyond an end of the vehicle. The flow guide divides an air flow at the trailing edge of a vehicle to avoid the creation of turbulence in the air flow as it encounters the gap between the vehicle and the trailing vehicle.

17 Claims, 3 Drawing Sheets

AIR FLOW GUIDE FOR A TRACTOR TRAILER GAP

This application claims the benefit of U.S. Provisional Patent Application No. 61/373,409, filed Aug. 13, 2010.

FIELD OF THE INVENTION

The invention relates to devices for improving the aerodynamics of a vehicle combination, and more particularly, to a device for reducing the drag effect of the gap between a truck tractor and towed trailer.

BACKGROUND AND SUMMARY OF THE INVENTION

The gap between a truck tractor and a trailer connected to the tractor is needed to allow the articulated movements for steering and to accommodate road risings and dips while avoiding contact between the tractor and trailer. The gap, however, is a well-known source of aerodynamic drag on the vehicle combination. Many devices have been proposed to solve this problem, including U.S. Pat. No. 3,71,146 showing telescoping panels to close the gap; U.S. Pat. No. 6,991,281 showing a roof fairing and U.S. Pat. Nos. 6,846,035 and 5,078,448 showing side fairings to direct air flow around or past the gap; U.S. Pat. No. 3,945,677 disclosing a flexible bag-like device filling the gap; U.S. Pat. No. 3,697,120 showing flow guides to create a swirl in the gap; U.S. Pat. No. 4,257,640 disclosing a baffle to block air flow across the gap; and, U.S. Pat. No. 7,216,923 disclosing a device to inject air into the gap to increase the pressure in the gap.

One problem in fairings is that the relatively high pressure air coming off the fairing trailing edge of the fairing is drawn into the relatively lower pressure air in the gap, creating turbulence and increased drag.

The inventor has posited that if a boundary layer of the flow along the side of truck tractor can be bled off of the fairing into the gap, that is, divided from the main flow and directed into the gap, a higher pressure region can be created in the gap along with an accompanying lower pressure along the fairing. This would equalize the pressure at the trailing edge of the fairing and prevent the formation of turbulence.

The invention proposes a device to control the air flow boundary layer at the gap to prevent turbulent flow at the gap. The invention concerns a flow guiding device placed where a cab side fairing is conventionally positioned on the truck tractor, the flow guiding device shaped to divide an air flow over the truck tractor at a boundary layer, directing a portion of the air flow into the gap between the tractor and the trailer, and directing the remainder to flow past the trailer. The divided portion rejoins the main portion of the air flow in such a way that turbulence in the air gap is prevented or reduced.

According to the invention, a flow guiding device is disposed at the rear of a truck tractor cab to extend vertically at the front portion of the gap between the truck tractor and a trailer. The device is spaced laterally from the truck tractor to provide a space at the forward end of the device between the device and the side of the truck tractor. The device extends longitudinally (parallel to the long axis of the truck) from a point adjacent the truck tractor to a point rearward of the truck tractor along the gap. The device divides the air flow, directing a relatively higher pressure stream into the gap side of the device, which causes the pressure at the trailing end of the device to equalize when the flows rejoin, reducing turbulence in the gap, and promoting a lower drag flow directed to the trailer. The longitudinal dimension of the device is sufficient to produce the flow effect from the trailing edge of reduced turbulence in the gap and a directed flow to the trailer.

An air guiding device according to the invention has two opposing surfaces shaped so that flow on one surface is slower than flow on the other surface. The device may be shaped as an airfoil, having a concave surface and an opposite convex surface. Alternatively, the device may have a convex surface and an opposite flat surface.

The device is mounted by brackets to the truck cab, the number of brackets being selected to prevent excessive flexing or bending of the device.

The device may be mounted with a convex surface facing the gap, and oriented to bleed off a layer of air flow into the gap, so that the outer and inner flows (relative to the device) rejoin without producing turbulence. Alternatively, the device may be mounted with the concave or flat surface facing the gap. It is expected that the orientation of the device relative to the gap, that is, the angle the device forms with the longitudinal direction, will influence the flow dividing and pressure equalizing effect.

The device may be mounted to be freely pivotable along its vertical axis to allow for self-adjustment. Alternatively, the orientation can be controlled by actuators responsive to electronic pressure sensing devices monitoring pressure on the outer and inner sides of the device. A controlled system can continuously adjust the device for optimum air flow.

A preferred embodiment of the invention includes an airfoil shaped device positioned to divide the flow and which device can be tuned to equalize the pressure in the outer and inner flows, as well as direct a slip stream to the trailer. Further, a preferred embodiment of the invention is a device that dynamically adjusts to air flow conditions to optimize air flow across the gap, and creates a substantially laminar flow directed to the leading edge of the trailer.

An airfoil device according to the invention may take any of a number of shapes capable of producing a flow effect to equalize pressure in an air flow downstream of the airfoil device, including, but not limited to, cambered, symmetrical, non-symmetrical, and circular arc, among others.

The device may include vortex generators formed or disposed at the trailing edge of the device to generate vortices in the flow directed to the trailer. Vortices in the air flow on a surface such as the trailer outer surface reduce surface friction.

According to another embodiment, the device of the invention is a vented fairing, a conventional fairing shaped or mounted on the truck tractor to bleed a layer of air into the tractor-trailer gap from the air flow and allow the divided flows to rejoin at a trailing edge.

BRIEF DESCRIPTION OF THE DRAWINGS

The invention will be better understood by reference to the following detailed description read in conjunction with the appended figures, in which.

DETAILED DESCRIPTION

The invention is directed to an air flow guide apparatus that may be mounted on a lead vehicle connected to a trailing vehicle to influence the air flow characteristics in a gap between the vehicles. More specifically, the air flow guide apparatus of the invention divides an air flow at a trailing edge of the lead vehicle to create a higher pressure flow on a gap side of the apparatus and a lower pressure flow on an outward facing side of the apparatus to avoid the creation of turbulence in the gap. It is believed that while some of the air flow, in particular, air flow in the boundary layer on the vehicle surface, will flow into the gap and create turbulence, the overall effect of the flow guide is less turbulence and an improvement in drag. The pressures on the gap side and outward side of the flow guide will come to equilibrium where they rejoin at a trailing end of the flow guide to create a laminar flow directed to the trailing vehicle and prevent or diminish the amount of air entering the gap downstream of the flow guide for an overall reduction in aerodynamic drag.

Figure 1:
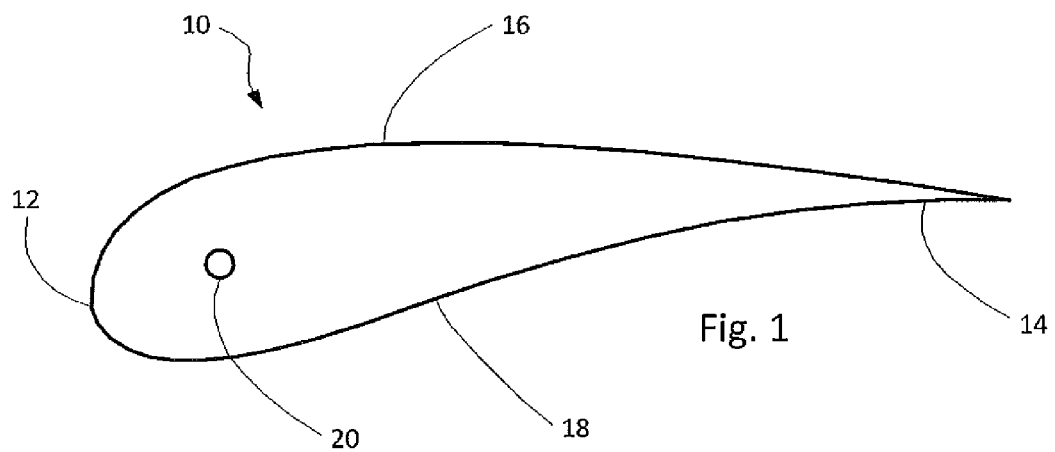
FIG. 1 is a view of a first embodiment of a flow guiding device according to the invention having a non-symmetric cambered body.

A first embodiment of a flow guide 10 in accordance with the invention is shown a top view in FIG. 1. The flow guide 10 of FIG. 1 is a rigid element having a cambered teardrop shape, as that of a vane or airfoil, having a leading edge 12 and a trailing edge 14. The leading edge 12 is bulbous and the flow guide 10 tapers to the trailing edge 14, providing a convex curved side 16 and a concave curved side 18. The flow guide 10 has a pivot axis 20, as will be described in greater detail below.

Figure 2:
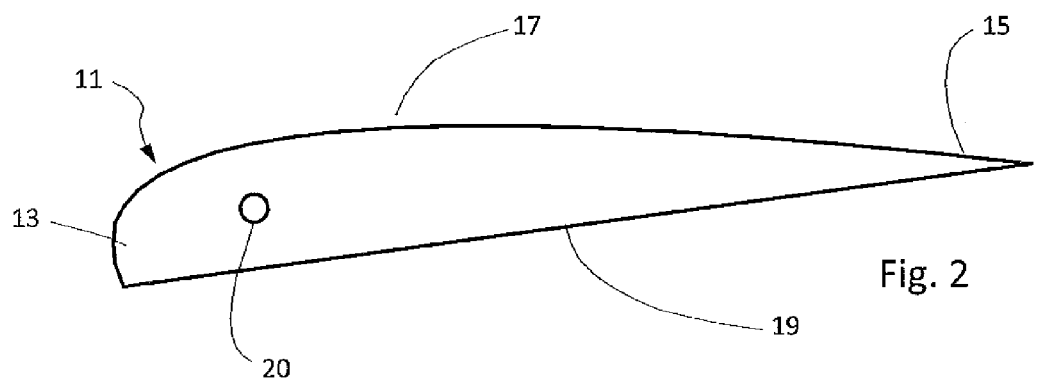
FIG. 2 is a view of an additional embodiment of a flow guiding device according to the invention having a non-symmetric body with a curved side and a flat side.

FIG. 2 illustrates an alternative embodiment of a flow guide 11. The flow guide of FIG. 2 has a leading edge 13 and a trailing edge 15, the leading edge being semi-bulbous (having a rounded side and a flat side) and the flow guide 11 tapering to the trailing edge. The flow guide 11 has a convex surface 17 and a substantially flat surface 19.

The embodiments illustrated here are for the purposes of describing the invention. Other shapes capable of dividing an air flow into a higher pressure flow and a lower pressure flow may be suitable if given an appropriate angle of orientation relative to the air flow.

Figure 3:
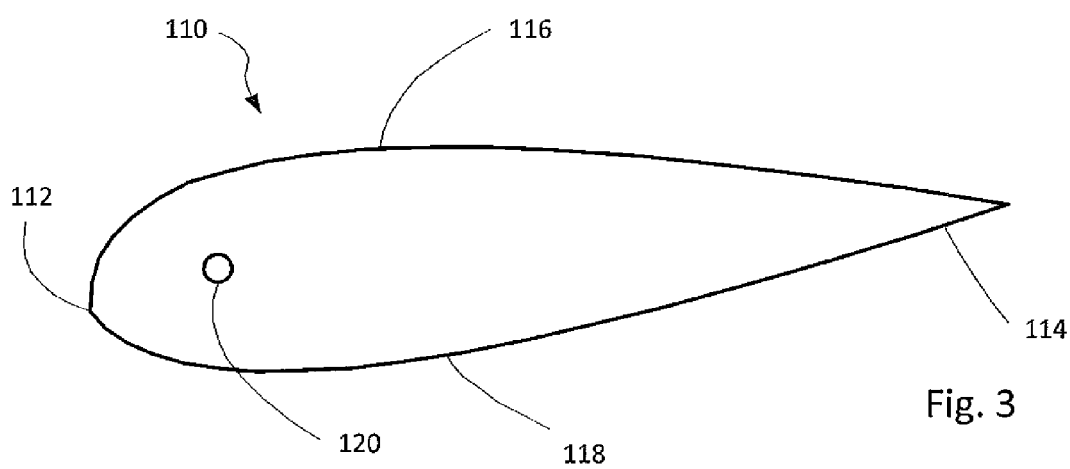
FIG. 3 is a view of yet another embodiment of a flow guide device according to the invention having a symmetric cambered body.
Figure 4:
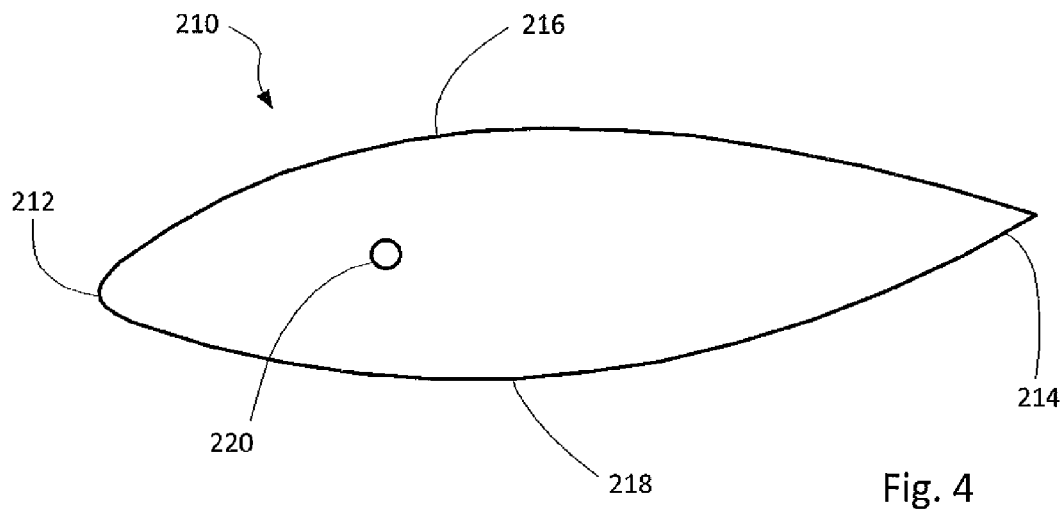
FIG. 4 is a view of an additional alternative embodiment of a flow guide according to the invention showing a circular arc body shape.
Figure 5:
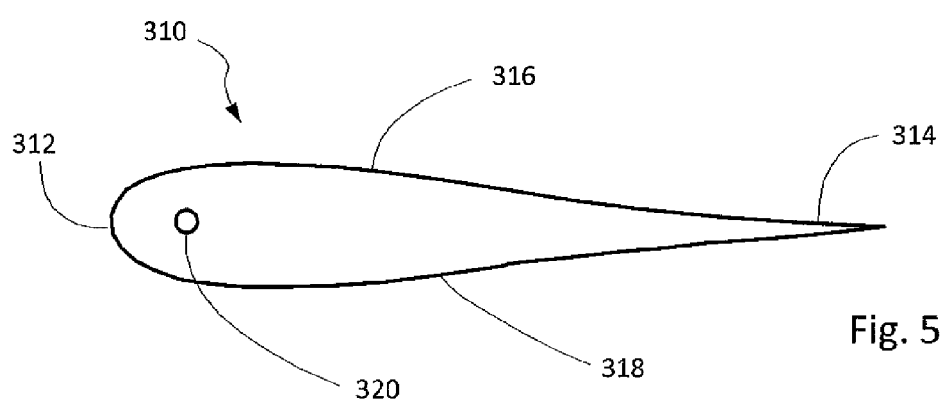
FIG. 5 is a view of an alternative embodiment of a flow guide according to the invention showing a form having concave curvatures on both sides.

For example, a symmetric vane 110 as shown in FIG. 3, having a bulbous nose 112 and tapered tail 114 and convex curves on both side 116, 118 may be suitable. FIG. 4, shows a circular arc shaped vane 210 having convex curvatures on both sides 216, 218, with a tapered nose 212 and tapered tail 214. FIG. 5 shows another alternative vane 310 having a bulbous nose 312 and tapered tail 314, with concave curvatures on both sides 316, 318.

A flow guide may be incorporated in another flow control device, such as a fairing that encloses part of the gap between the leading and trailing vehicle. A flow control device of the invention may be formed or mounted at the trailing edge of the fairing. Alternatively, a cab side fairing may be formed with the shape of the flow guide of the invention.

Figure 6:
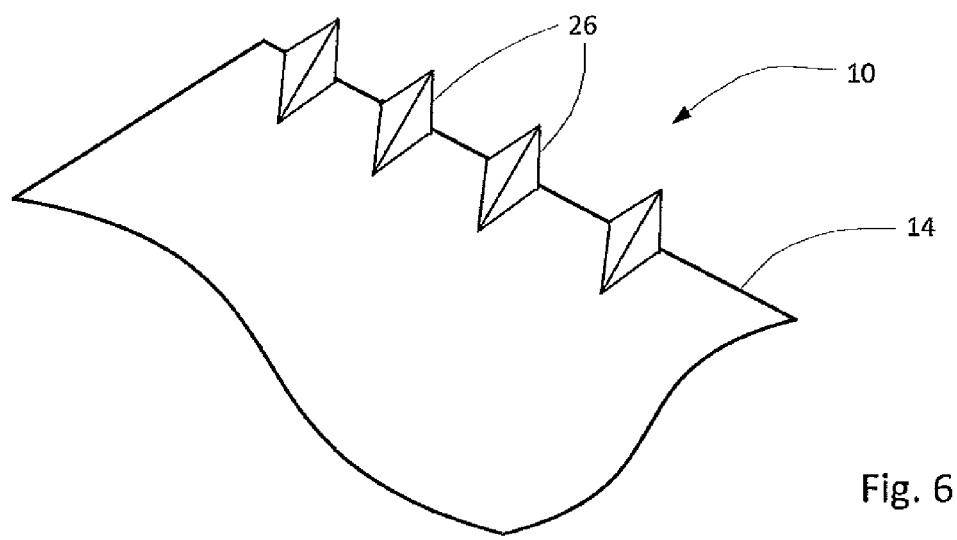
FIG. 6 is a section view of another embodiment of a flow guiding device including vortex generators.

According to another aspect of the invention, a flow guide of the invention may include vortex generating devices formed or mounted at the trailing edge of the flow guide. Vortices in the air flow contacting the trailing vehicle surface help reduce drag. FIG. 6 shows a perspective section view of a trailing end 14 of flow guide 10 according to FIG. 1 including vortex generators 26 at the trailing edge 14. The vortex generators 26 are illustrated as triangular wedges rising from the surface 16 of the flow guide 10. Vortex generators may have other shapes as is known in the art.

Figure 7:
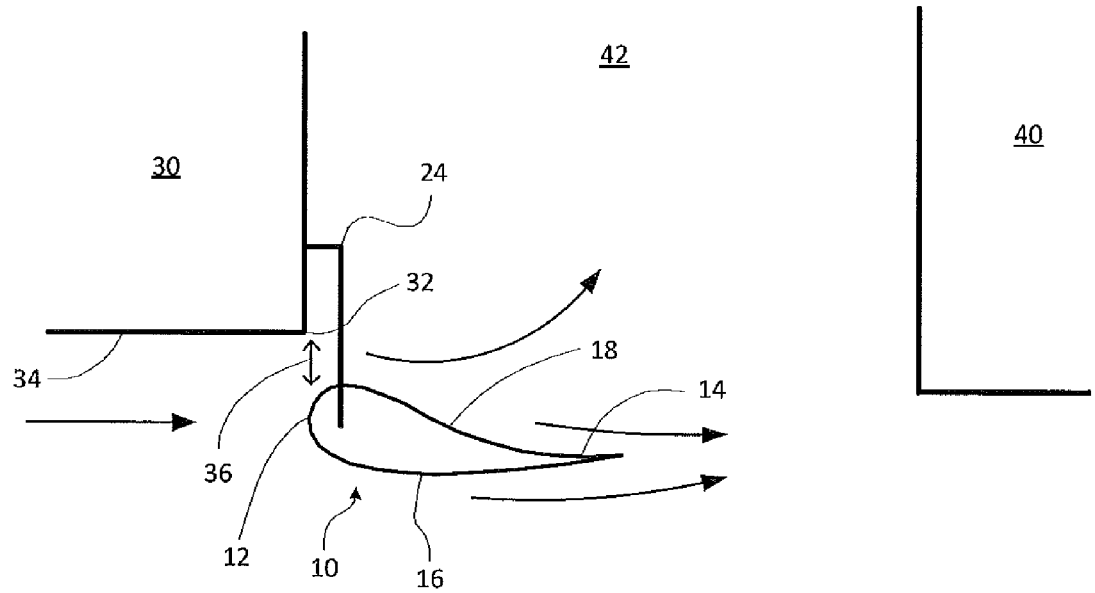
FIG. 7 is a schematic view of a first arrangement of a flow guiding device on a truck tractor; and, FIG. 8 is a schematic view of an alternative arrangement of a flow guiding device on a truck tractor.

FIG. 7 is a schematic top view of an arrangement of the flow guide apparatus on a vehicle 30 connected to a trailing vehicle 40. The vehicle 30 may be a tractor truck and the trailing vehicle 40 may be a trailer as is known in the tractor-trailer combination. The vehicle 30 alternatively may be a leading trailer in a tandem or triple trailer combination. A trailer connected to the leading trailer would be the trailing vehicle 40. The leading vehicle 30 and connected trailing vehicle 40 are spaced longitudinally so that a gap 42 between the vehicles is provided. The gap 42 accommodates relative movement between the vehicles, as for turning or road risings and fallings, to avoid contact between the vehicles.

As seen in FIG. 7, a flow guide 10, illustrated here as the flow guide of FIG. 1, is mounted at the trailing edge 32 of the vehicle 30 by way of a bracket assembly 24 or similar arrangement. The bracket arrangement 24 mounts the flow guide 10 in a vertical orientation relative to the vehicle 30, that is, with the leading edge 12 of the flow guide substantially parallel to a trailing edge 32 of an outer lateral surface 34 of the vehicle. it should be noted that the flow guide 10 extends for substantially the entire height of the trailing edge 32 of the vehicle 30, or as may be accommodated at the trailing edge of the vehicle. The flow guide 10 is positioned with a space 36 between a gap side 18 of the flow guide and the outer lateral surface 34 of the lead vehicle 30. Preferably, the space 36 is provided so that the flow guide divides a boundary layer from the main body of the air flowing along the vehicle lateral side surface 34.

As may be seen by the arrows depicting air flow, the flow guide 10 divides the air flow departing the outer lateral surface 34. The flow guide is positioned and oriented so that the air flow is divided into a higher pressure flow on the gap side 18 of the flow guide 10 and a lower pressure flow on the outward facing surface 16 of the flow guide, The divided flow joins at the trailing edge 14 of the flow guide. The higher pressure flow on the gap side is believed to help prevent the air flow departing the outer lateral surface 34 of the vehicle from entering the gap 42, and thus avoid creating turbulence in the gap. The leading edge 12 of the flow guide 10 is positioned relative to the trailing edge 32 of the vehicle 30 so to divide the boundary layer of the air flow detaching from the lateral surface 34 of the vehicle. This may be at, ahead, or behind the trailing edge 32 as appropriate for the flow characteristics generated by the outer lateral surface 34 of the vehicle.

The bracket assembly 24 may include an upper bracket and a lower bracket at opposite top and bottom ends of the flow guide 10. Alternatively, additional brackets between an upper and lower bracket may be provided as need to prevent bending or flexing of the flow guide 10.

According to an embodiment of the invention, the bracket assembly 24 mounts the flow guide 10 for pivotal movement on a vertically oriented pivot axis 20, which may be an axis parallel or substantially parallel to the outer lateral surface 34 of the vehicle, or an axis perpendicular to a horizontal plane defined by the wheel axles of the vehicle 30. The pivot axis 20 is located forward of the center of pressure of the flow guide for stability of the flow guide 10 in moving air.

The flow guide 10 may be mounted freely pivotal on the bracket assembly 24 to self-adjust an angle of the flow guide relative to the longitudinal direction of the vehicle to accommodate the air flow characteristics at different vehicle speeds. In such an embodiment, the bracket assembly 24 may include a rod coincident with the pivot axis on which the flow guide mounted, or an upper and lower pin arrangement, or other arrangement as will occur to those skilled in the art. In addition, stops may be provided to limit the angular range of motion.

Alternative to being freely pivotal, the bracket assembly may include an actuator for adjusting and controlling the angle of the flow guide 10. The actuator may be a linear actuator mounted to the vehicle 30 and connected to the flow guide 10 or a rotary actuator connected on the bracket assembly 24. The actuator may be controlled responsive to a vehicle speed. Alternatively, the actuator may be controlled responsive to air pressure readings from sensors on the gap side surface and outward facing surface of the flow guide so that a desired higher air pressure is present on the gap side surface.

According to yet another alternative, the flow guide may be oriented at a fixed angle optimized for a particular vehicle speed and generated air speed, for example for a highway truck combination that operates for extended periods at a particular speed.

Figure 8:
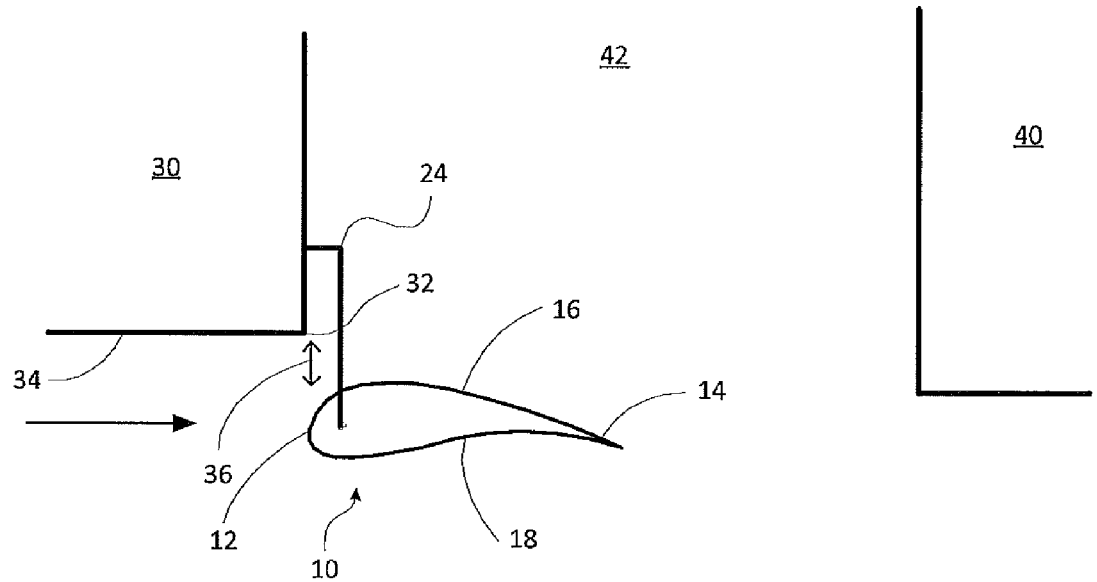

FIG. 8 shows an alternative arrangement of the flow guide 10 mounted on the bracket assembly 24. In this arrangement, the concave surface 18 of the flow guide 10 is on the gap side and the convex surface 16 is on the outward facing side. Either of the arrangements of FIG. 4 and FIG. 5 may be used depending on which provides the most favorable flow characteristics in terms of a pressure difference between gap side and outward facing side and in terms of the direction and turbulence avoidance ability of the flow joining at the trailing edge of the flow guide.

Any flow guide embodiment, including those shown in FIGS. 1 through 5, may be used in the arrangements illustrated in FIG. 7 and FIG. 8, and the descriptions of FIG. 7 and FIG. 8 should be understood to be inclusive of different embodiments of the flow guide.

The invention has been described in terms of preferred embodiments and components; however, those skilled in the art will understand that substitutions for those things described here may be made without departing from the scope of the invention as defined by the appended claims.

What is claimed is:

1. An apparatus for affecting airflow in a gap between a lead vehicle and a connected trailing vehicle, comprising:
   a guide vane having a leading edge and a trailing edge, the leading edge being bulbous and tapering to the trailing edge, and being mountable to have a gap side surface and an outward facing surface; and,
   a support apparatus mountable on a vehicle for supporting the guide vane in a vertical orientation relative to the vehicle with a space between the vehicle and the guide vane gap side surface and with at least a portion of the vane extending beyond an end of the vehicle and, wherein the guide vane is freely pivotable on the pivot axis.

2. The apparatus of claim 1, wherein the support apparatus includes a pivot axis on which the guide vane is supported for pivotal movement on a vertical axis.

3. The apparatus of claim 2, comprising an actuator to control a pivot angle of the guide vane, the actuator responsive to air pressure sensed on the gap side surface and outer facing surface of the guide vane.

4. The apparatus of claim 1, comprising at least one vortex generator mounted on the trailing end of the guide vane.

5. The apparatus of claim 1, wherein the gap side surface has a convex curvature and the outward facing surface has a concave curvature.

6. The apparatus of claim 1, wherein the gap side surface has a concave curvature and the outward facing surface has a convex curvature.

7. The apparatus of claim 1, wherein the gap side surface has a convex curvature and the outward facing surface has a convex curvature.

8. The apparatus of claim 1, wherein the gap side surface has a concave curvature and the outward facing surface has a concave curvature.

9. A vehicle having an apparatus for affecting airflow in a gap between the vehicle and a connected trailing vehicle, comprising:
   a guide vane having a leading edge and a trailing edge, the leading edge being bulbous and tapering to the trailing edge, and being mountable to have a gap side surface and an outward facing surface; and,
   a support apparatus mounted on a vehicle for supporting the guide vane in a vertical orientation relative to the vehicle with a space between the vehicle and the guide vane gap side surface and with at least a portion of the vane extending beyond an end of the vehicle.

10. An apparatus for affecting airflow in a gap between a lead vehicle and a connected trailing vehicle, comprising:
   a guide vane having a leading edge and a trailing edge, and mountable to have a gap side surface and an outward facing surface; and,
   a support apparatus mountable on a vehicle for supporting the guide vane in a vertical orientation relative to the vehicle with a space between the vehicle and the guide vane gap side surface and with at least a portion of the vane extending beyond an end of the vehicle, the support apparatus including a pivot axis on which the guide vane is supported for free pivotal movement on a vertical axis to be pivotally self-adjusting in moving air.

11. The apparatus of claim 10, comprising at least one vortex generator mounted on the trailing end of the guide vane.

12. The apparatus of claim 10, wherein the gap side surface has a convex curvature and the outward facing surface has a concave curvature.

13. The apparatus of claim 10, wherein the gap side surface has a concave curvature and the outward facing surface has a convex curvature.

14. The apparatus of claim 10, wherein the gap side surface has a convex curvature and the outward facing surface is substantially flat.

15. The apparatus of claim 10, wherein the gap side surface is substantially flat and the outward facing surface has a convex curvature.

16. The apparatus of claim 10, wherein the gap side surface has a convex curvature and the outward facing surface has a convex curvature.

17. The apparatus of claim 10, wherein the gap side surface has a concave curvature and the outward facing surface has a concave curvature.

* * * * *